US005105205A

United States Patent [19]

Fagerquist

[11] Patent Number: 5,105,205

[45] Date of Patent: Apr. 14, 1992

[54] CONTINUOUS INK JET CATCHER DEVICE HAVING IMPROVED FLOW CONTROL CONSTRUCTION

[75] Inventor: Randy L. Fagerquist, Dayton, Ohio

[73] Assignee: Eastman Kodak Company, Rochester, N.Y.

[21] Appl. No.: 724,039

[22] Filed: Jul. 1, 1991

[51] Int. Cl.[5] ............ G01D 15/18

[52] U.S. Cl. ............ 346/75

[58] Field of Search ............ 346/75

[56] References Cited

U.S. PATENT DOCUMENTS 3,813,675 5/1974 Steffy et al. ............ 346/75
3,836,914 9/1974 Duffield ............ 346/75
4,035,811 7/1977 Paranjpe ............ 346/75
4,084,164 4/1978 Alt et al. ............ 346/75
4,460,903 7/1984 Guenther et al. ............ 346/75

*Primary Examiner*—Benjamin R. Fuller
*Assistant Examiner*—Gerald E. Preston
*Attorney, Agent, or Firm*—John D. Husser

[57] ABSTRACT

An improved catcher device for a continuous ink jet printer of the kind having a linear orifice array for producing a linear curtain of parallel drop streams. The catcher device includes: (i) an elongated impact surface constructed and located to be adjacent a region of the droplet curtain; (ii) a drop discharge channel located downstream from the drop impact surface; and (iii) a screen element across the mouth of the drop discharge channel.

10 Claims, 4 Drawing Sheets

CONTINUOUS INK JET CATCHER DEVICE HAVING IMPROVED FLOW CONTROL CONSTRUCTION

FIELD OF INVENTION

The present invention relates to drop-catcher devices for continuous ink jet printing apparatus and, more specifically, to improved catcher device constructions for controlling the flow of caught ink.

BACKGROUND OF INVENTION

In general, continuous ink jet printing apparatus have a print head manifold cavity to which ink is supplied under pressure so as to issue in a streams from a print head orifice plate that is in liquid communication with the cavity. Periodic perturbations are imposed on the liquid streams, e.g. vibrations by an electromechanical transducer, to cause the streams to break-up into uniformly sized and shaped droplets. A charge plate, comprising an array of addressable electrodes, is located proximate the streams break-off points to induce an electrical charge, selectively, on adjacent droplets, in accord with print information signals. Charged droplets are deflected from their nominal trajectory; e.g. in one common (binary) printing mode, charged (non-print) droplets are deflected into a catcher device and non-charged droplets proceed to the print medium.

A number of different catcher devices have been developed as constructions to intercept and recirculate the non-print droplets from such print heads. The catcher devices must take several potential problems into account. First, the catcher device must intercept the non-print ink droplets in a way that avoids splattering them onto the print medium, or scattering into an ink mist, which also can cause defects on the print media. Second, the catcher devices must effectively remove the caught ink away from the droplet interception zone so that a build-up of ink on the catching surface does not block the flight path of printing drops.

To accomplish these purposes, one prior art approach provides catcher devices with a drop impact surface generally parallel to the print drop trajectory and provides a drop discharge channel below the drop impact surface. Typically, a vacuum source is coupled to the drop discharge channel to urge a uniform ink discharge flow, from the impact surface to a channel egress. To enhance the uniformity of ink discharge flow, grooves and ridges, extending in the direction of desired flows, have been provided on the catcher impact surface and in the drop discharge channel (see U.S. Pat. Nos. 3,813,675 and 3,836,914).

U.S. Pat. No. 4,035,811 is exemplary of another prior art catcher feature in its provision of a porous drop discharge channel wall, which ingests stray ink droplets.

The above and other catcher constructions perform adequately where the catcher is not moving during the print operation and where the droplet stream is vertical (so that ink in the discharge channel is not subjected to transverse gravitational forces). However, when the catcher is part of a print head assembly acceleration forces can cause ink at its discharge channel ingress to be slung away from the catcher. Slung ink masses can appear on the print media as defects or contaminate the machine. Even where the acceleration forces are not sufficient to sling the ink, they can cause dynamic buckling of the ink film just entering the discharge channel ingress. The buckled ink film can obstruct ink droplets which should pass to the print media, which will cause splatter and/or "white defects", as a result of the droplet interception.

Also, in applications where it is desirable to dispose the print head at various orientations (e.g. along a bindery line), the prior art catcher devices do not perform properly. That is, when a print head is disposed with the line direction of its orifice array non-parallel to the horizontal (e.g. tilted at 45° or 90°), the catcher ingress throat and the ink discharge flow path are correspondingly tilted. In such orientations it has been observed that gravity causes ink build-up along the "low" sides of the catcher throat and discharge channel. This eventually causes ink to drip from the catcher ingress throat.

SUMMARY OF INVENTION

One significant purpose of the present invention is to provide for continuous ink jet printing, droplet catcher devices having improved control of the caught ink. The constructions of the present invention are particularly advantageous in applications where the catcher device is subject to accelerations during printing and/or where the catcher throat and ink discharge channel are tilted transversely with respect to the horizontal.

In one aspect, the present invention constitutes an improved catcher device for a continuous ink jet printer of the kind having a linear orifice array for producing a linear curtain of parallel drop streams. The catcher device includes: (i) an elongated impact surface constructed and located to be adjacent a region of the droplet curtain; (ii) a drop discharge channel located downstream form the drop impact surface and having an ingress mouth throat that is elongated in a direction generally parallel to the linear orifice array; and (iii) a screen member located across the channel ingress mouth.

In a related aspect the present invention constitutes a continuous ink jet printing system wherein such an improved drop catcher device is located in an operative relation to a print medium such that the elongated direction of the catcher mouth is nonparallel to the horizontal.

BRIEF DESCRIPTION OF DRAWINGS

The subsequent description of preferred embodiments refers to the accompanying drawings wherein.

DETAILED DESCRIPTION OF PREFERRED EMBODIMENTS

Figure 1:
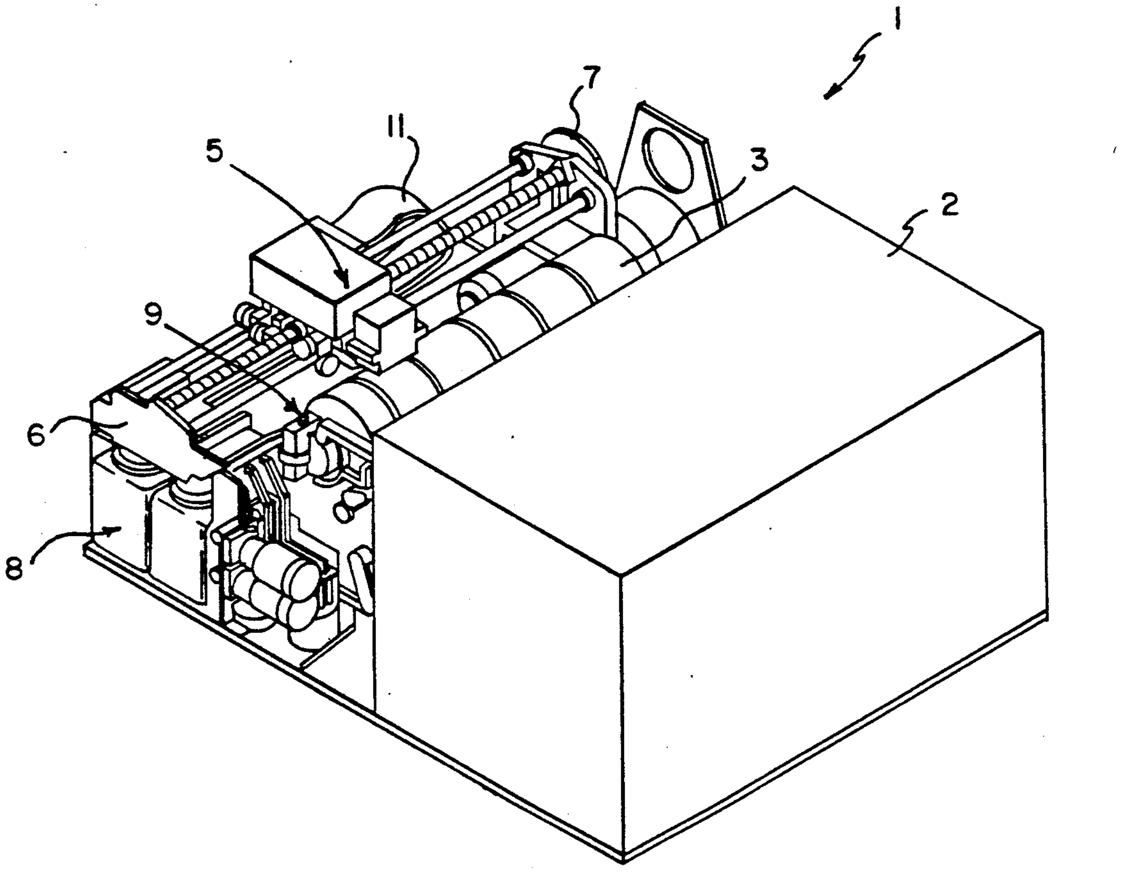
FIG. 1 is a perspective of a moving print head printer which can advantageously employ the present invention.

FIG. 1 illustrates a moving print head ink jet printer 1 which can employ the present invention. In general, the printer 1 comprises a paper feed and return sector 2 from which sheets are transported into and out of operative relation on printing cylinder 3. A print head assembly 5 is mounted for movement on carriage assembly 6 by appropriate drive means 7, and during printing operation the print head assembly is traversed across a print path in closely spaced relation to a print sheet on cylinder 3. Ink is supplied to and returned from the print head assembly by means of flexible conduits 11 which are coupled to ink cartridge(s) 8.

Figure 3:
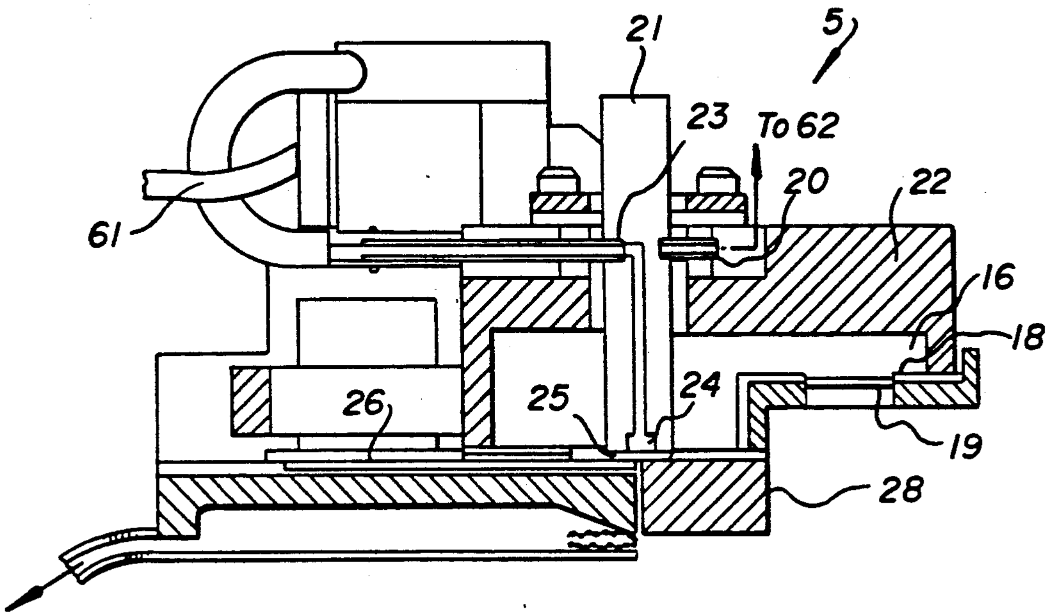
FIG. 3 is a cross-section of one ink jet print head embodying the present invention.

Referring to FIG. 3, one embodiment of print head assembly 5, according to the present invention, can be seen in more detail. The assembly 5 includes an upper print head body 21 mounted on housing 22 and having an inlet 23 for receiving ink. The body 21 has a passage leading from inlet 23 to one end of a manifold cavity 24 and an outlet 20, leading from the other end of manifold cavity 24 to the ink recirculation system. The upper print head also includes an orifice plate 25 and suitable transducer means (not shown) for imparting mechanical vibrations to the body 21 and orifice plate 25. Such transducer can take various forms known in the art for producing periodic perturbations of the ink filament(s) issuing from the orifice plate 25 to assure the ink filaments break into streams of uniformly spaced ink droplets The lower portion of print head assembly 5 includes a charge plate 26 constructed to impart desired charge upon ink droplets at the point of filament break-up and a droplet catcher device 27 that is constructed and located to catch non-printing droplets (in this arrangement charged droplets).

Figure 2:
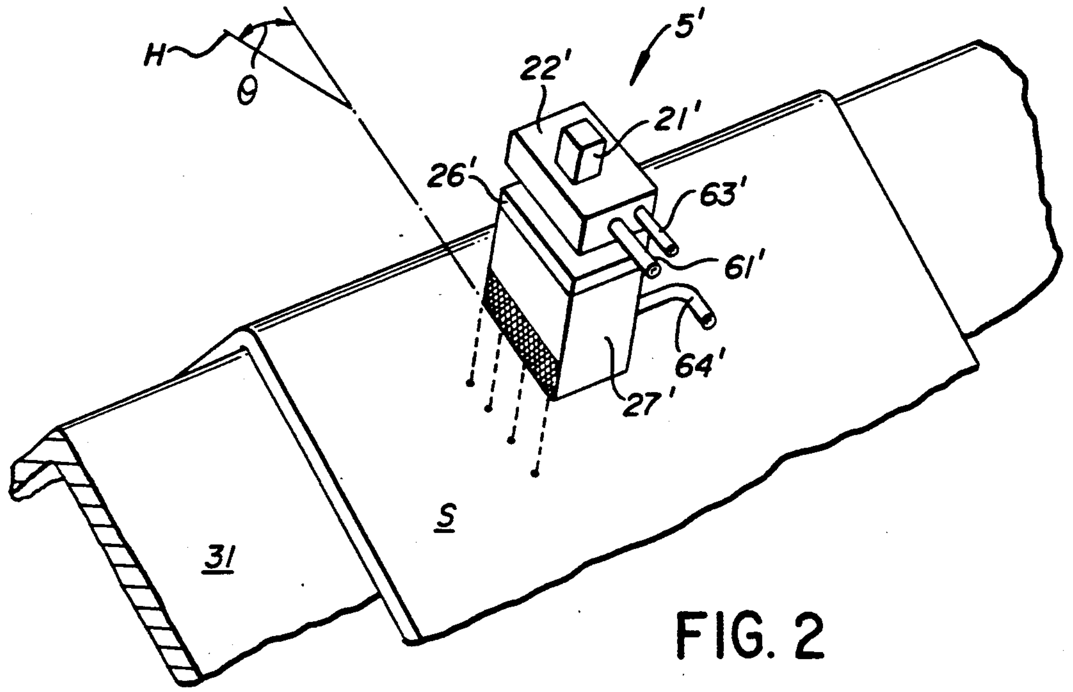
FIG. 2 is a perspective view of a remote print head printer system which can advantageously employ the present invention.

Preferred catcher constructions will be described in more detail subsequently with respect to FIG. 3 and FIGS. 4–6; however, first, another highly useful functional application for catcher constructions of the present invention will be described with reference to FIG. 2. In FIG. 2, the remote print head 5′ is similar to that shown and described with respect to FIGS. 1 and 3. However, print head 5′ is coupled to an ink supply, power and control module (not shown) by ink umbilicals 61′, 63′, 64′ and electronic cables (not shown) and is employed along the path of conveyor chain 1 of a bindery system. Systems like that shown in FIG. 2 employ ink jet printing to print personalized data on pre-printed "signature" portions of a brochure or magazine as the "book" is built-up, during movement past successive feeder boxes located along the conveyer chain path. Often a special fixture is used to manipulate signatures into a horizontal orientation as they move past the ink jet printing station. However, as shown in FIG. 2, the remote print head 5′ is tilted vis a vis the horizontal H at an angle Θ to accommodate printing on the signature sheet S in its rest position on chain 31. The unique catcher construction which allows operation at such a tilted orientation without dripping (and which also allows operation in the FIG. 1, moving print head mode, without drop slinging) can be viewed better in FIGS. 4–6.

Figure 4:
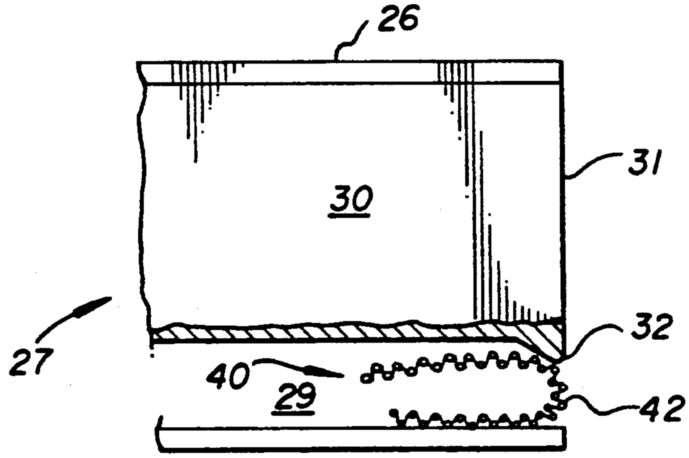
FIG. 4 is an enlarged side view of the catcher device construction of the FIG. 3 print head.
Figure 5:
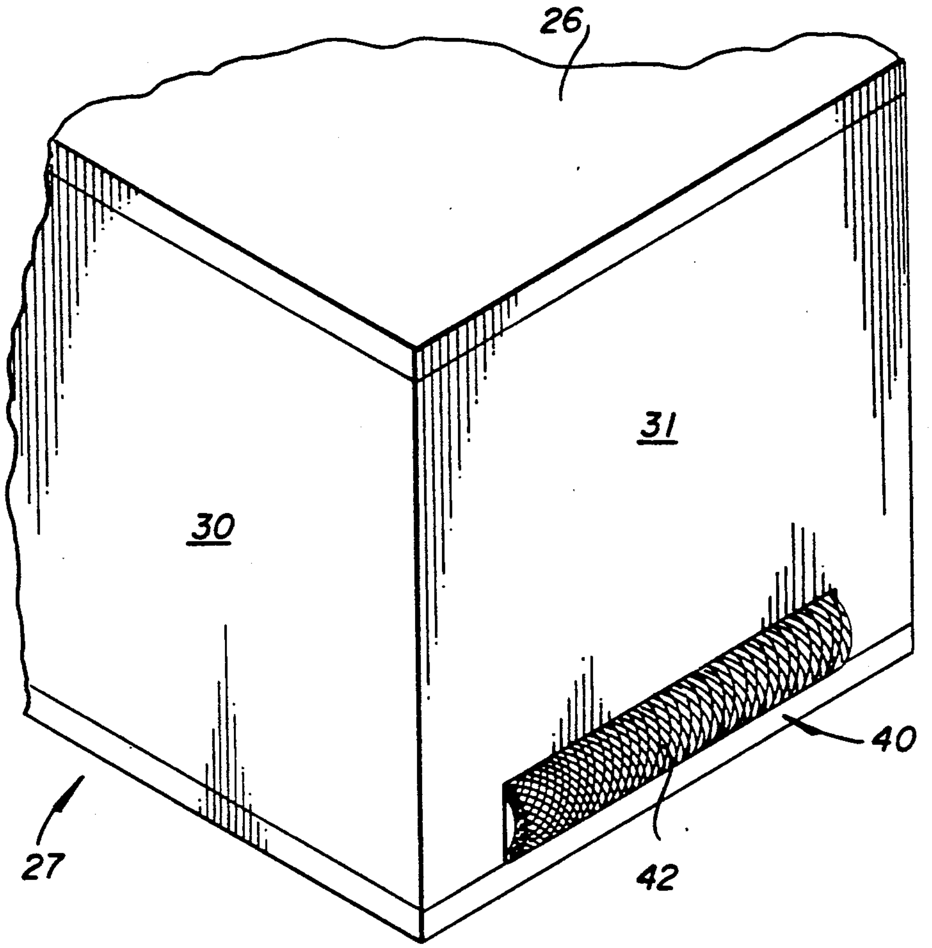
FIG. 5 is an enlarged perspective view of a portion of the FIG. 3 catcher device.
Figure 6:
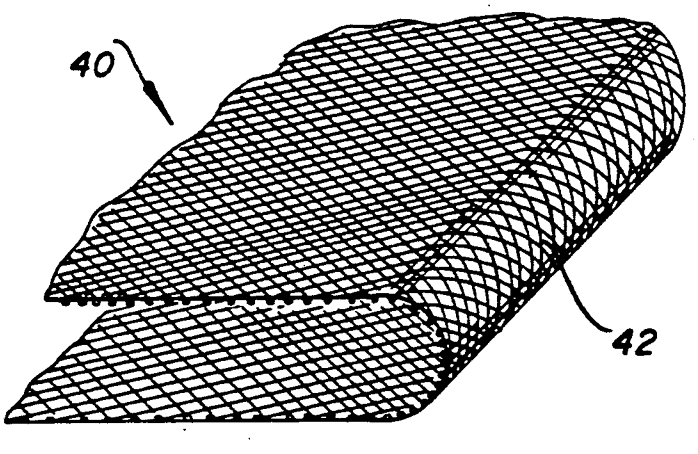
FIG. 6 is an enlarged perspective view of one preferred embodiment of an apertured screen element useful in accord with the present invention.

Thus, in FIGS. 4–6 it can be seen that, in accord with the present invention, a screen element 40 is located in the throat and across the mouth of the discharge channel 29 of catcher device 27. The catcher device 27 also comprises a catcher body 30 having a drop impact surface 31, which is located (as shown in FIG. 3) to be adjacent the drop stream curtain that is ejected from orifice plate 25. When drops are charged by electrodes of plates 26, they are deflected to impact on surface 31 at a location upstream from the mouth 32 of the drop ingress throat to discharge channel 29. The momentum of drops impacting on catcher impact surface 31 carries the liquid mass along surface 31 toward the ingress mouth 32 and vacuum is applied to the discharge channel to withdraw the ink for recirculation.

As shown, the screen member 40 has a face portion 42 of its major surface that extends across the mouth 32 of the drop discharge channel, approximately flush with the adjacent drop impact surface region. It is desirable for purpose of mounting and flow control in the catcher throat zone, that the screen element comprise a "U" shape cross-section as shown best in FIG. 6. However, the necessary component according to the invention is the face portion 42 which covers the ingress mouth of the catcher. When constructed according to the present invention, this component effects capillary wicking of the ink across the entire screen face surface, distributing ink evenly to avoid local build-up regions and preventing ink leakage from inside the catcher mouth (e.g. in response to accelerations). Screen elements according to the present invention, enable a lower vacuum head than prior art approaches employing porous metal elements. The screen element of the present invention are also less susceptible to ink blockage and easier to fabricate and clean.

Figure 7:
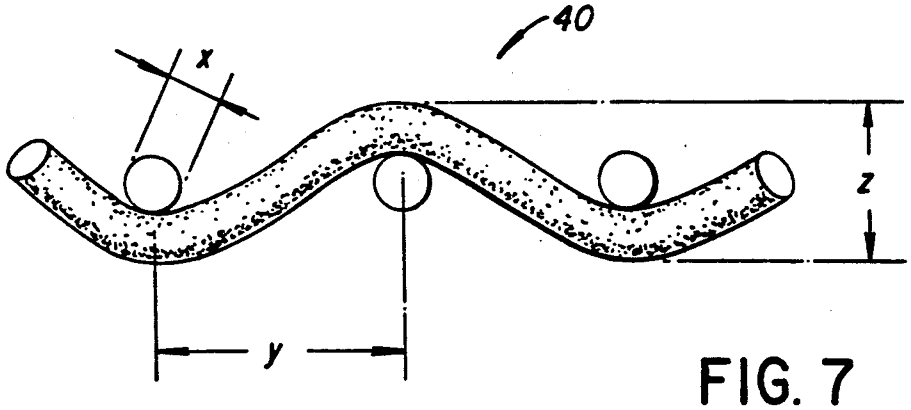
FIG. 7 is an enlarged cross-sectional view of the screen element of FIG. 6.

In general, screen elements according to this invention desirably have a major surface comprising apertures of face dimensions not significantly less than the screen thickness dimension. FIG. 7 illustrates one preferred embodiment wherein screen 40 is formed of woven metal strands of dimension $x=1.2$ mils and strand spacing $y=3.1$ mils so that the aperture face dimension of 1.9 mils (y-x) is not significantly less than the thickness, $z=2.5$ mils, of the screen element. Optimum dimensions for screen elements will vary slightly with ink properties such as viscosity and surface tension and with parameters such as overall ingress mouth size and ink flow rate. However "325" mesh stainless steel screen with dimensions as noted with respect to FIG. 7 will operate acceptably in most applications. Other screen materials, e.g. plastic screen mesh, can also be utilized; however, metal screen elements are preferred for their ability to be permanently shaped.

In experiments with printers such as described above, we have found that the screen element, fluid flow controller enables start-up and printing in any orientation without the print head dripping or drooling fluid from the catcher mouth area. Similarly, we have found such screen controllers and reduce or eliminate the fluid slinging phenomenon in moving print heads.

The invention has been described in detail with particular reference to certain preferred embodiments thereof, but it will be understood that variations and modifications can be effected within the spirit and scope of the invention.

I claim:

1. In a continuous ink jet printer having a linear array of orifices for producing a linear curtain of parallel drop streams, an improved drop catcher device comprising:

(a) an elongated drop impact surface located adjacent an intermediate region of said drop stream curtain;

(b) means defining: (i) an ink ingress mouth adjacent and downstream from, said drop impact surface and (ii) an ink discharge channel having a throat region coupled to said ingress mouth; and (c) screen means comprising a plurality of apertures extending across said ink ingress mouth, approximately flush with said adjacent drop impact surface.

2. The invention defined in claim 1 wherein said screen means comprises an element having a thickness and a major surface with apertures of face dimension not significantly less than said element thickness.

3. The invention defined in claim 1 wherein said screen means comprises a plurality of interwoven strands which effect capillary flow of ink across the plane of said screen means.

4. The invention defined in claim 3 wherein said screen means has a portion that extends within said throat region along the direction of ink discharge, as well as across said ink ingress mouth.

5. In a continuous ink jet printer of the kind having linear orifice means for producing a curtain of parallel drop streams, an improved drop catcher device comprising:

(a) a catcher body constructed with elongated drop impact surface and located adjacent a region of said drop stream curtain so that impact surface portions that are equidistantly downstream are substantially equidistantly opposite corresponding drop stream curtain regions;

(b) means defining a drop discharge channel downstream from said drop impact surface, said channel having an elongated ingress mouth that is approximately parallel to said orifice means; and (c) screen means comprising a plurality of uniformly sized and spaced apertures located across said channel ingress mouth.

6. The invention defined in claim 5 wherein said screen means comprises a plurality of interwoven strands which effect capillary flow of ink across the area of said ingress mouth.

7. The invention defined in claim 6 wherein said screen means extends within said channel, downstream along the direction of ink discharge, as well as across said throat channel.

8. Ink jet printing apparatus comprising: (i) a linear array of orifices constructed and located to produce, a curtain of drop streams directed toward a print media path; (ii) electrode means for selectively charge deflecting selected drops of said streams and (iii) catcher means for catching deflected drops, said apparatus characterized in that:

(1) said apparatus is oriented in printing operation so that said linear array of orifices is non-parallel to horizontal; and (2) said catcher comprises:

(a) an elongated drop impact surface constructed and located adjacent a region of said drop stream curtain;

(b) a drop discharge channel located downstream from said drop impact surface and having an elongated ingress mouth with its long dimension generally parallel to said orifice means; and (c) screen means located across said ingress mouth.

9. The invention defined in claim 8 wherein said screen means comprises an element having a thickness and a major surface having apertures of dimension not significantly less than said element thickness.

10. The invention defined in claim 8 wherein said screen means comprises a plurality of interwoven strands which effect capillary flow of ink across the plane of said screen means.

* * * * *